United States Patent Office 2,714,391
Patented Aug. 2, 1955

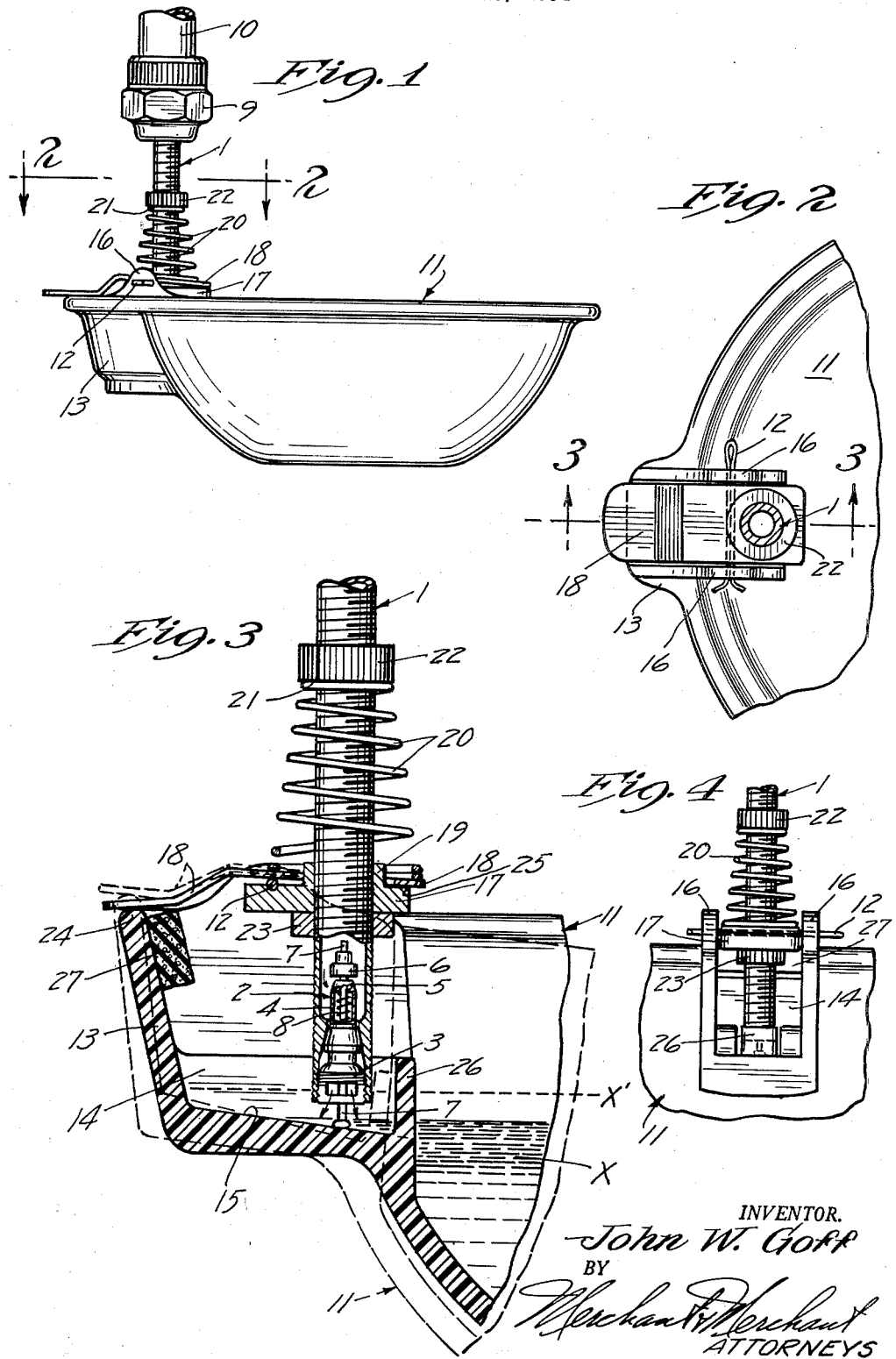

2,714,391

ANIMAL DRINKING FOUNTAIN

John W. Goff, St. Paul, Minn., assignor to United Screw Products & Mfg. Co., St. Paul, Minn., a corporation of Minnesota Application November 29, 1954, Serial No. 471,671

5 Claims. (Cl. 137—408)

My present invention relates to improvements in animal drinking fountains of the general character exemplified by the Kubista Patent No. 2,501,727 of March 28, 1950, wherein a water receptacle in the nature of an open topped bowl is mounted on and supplied with water from a rigidly mounted supply conduit. In this general type of drinking fountain or fount, the receptacle or bowl is mounted and guided on the supply conduit for generally upward and downward movements with respect to the supply conduit, the bowl is yieldingly urged upwardly, and the flow through the conduit to the receptacle is under control of a valve carried by the conduit and operatively coupled to the receptacle to respond to upward and downward movements of the latter and maintain the fluid volume in the receptacle between predetermined maximum and minimum limits. As is well known, some important advantages of devices of this general character, wherein the control valve is operated by movement of the receptacle responsive to varying fluid weight in the receptacle, over drinking fountains or devices of the kind wherein receptacle fluid level is maintained by a float-actuated valve, are, relatively low manufacturing cost due to simplicity of construction, lower maintenance cost, a greater compactness of structure, reduced susceptibility to maladjustment, relative simplicity of adjustment, better accessibility for cleaning and relatively simpler and quicker removal and replacement of the receptacle.

In prior art devices, such as exemplified by the Kubista Patent No. 2,501,727 and Null No. 2,295,964, the receptacles are suspended coaxially from their cooperating supply conduits and the valve operates as a result of straight-line upward and downward movements coaxially of the adjacent end of the conduit. Devices of this kind have been highly satisfactory for watering of poultry and the like, but are not well adapted to the watering of domestic animals, such as dogs, for example, due to the obstruction at the center of the receptacle resulting from the presence at that point of the supply conduit or the mounting therefor, unless the diameter of the receptacle be greatly and undesirably increased. It is an object of the instant invention to provide an improved drinking fountain of the general character above described wherein the supply conduit and its mounting is sufficiently displaced from the axis or center of the receptacle to allow unobstructed drinking by dogs and other relatively-large animals, but which nevertheless retains the above-described and other important advantages and characteristics of prior art devices of the general character in question.

Another important object of the invention is the provision of improved means in a device of the class described for detachably anchoring the receptacle to the supply conduit, whereby the receptacle is more readily removable and replaceable for cleaning and service purposes than has been possible in connection with prior art devices of this general character.

Other advantages of the device of the instant invention will be made apparent from the following specification, claims and appended drawings.

Referring to the drawings, wherein like characters indicate like parts throughout the several views:

Fig. 1 is a view in side elevation of a drinking fountain embodying a preferred form of the instant invention;

Fig. 2 is a fragmentary plan sectional view, taken on the horizontal line 2—2 of Fig. 1;

Fig. 3 is a greatly enlarged fragmentary sectional view, taken on the line 3—3 of Fig. 2; and Fig. 4 is a fragmentary view in side elevation, as viewed from the left toward the right in Fig. 1.

In the drawings, a generally vertically disposed, externally threaded tubular water supply conduit section is indicated by 1. This tubular conduit section 1 is substantially identical to the tubular valve stems used on pneumatic vehicle tires and is equipped with a valve mechanism indicated as an entirety by 2 of the type generally employed in pneumatic vehicle tires. This valve mechanism 2 is referred to in the vehicle tire industry as a valve core and comprises an externally screw-threaded anchoring head 3, which mates with internal screw threads in the lower or discharge end of the tubular conduit section 1. As is well known, these valves 2 are of the self-closing variety and further comprise a tubular body 4 integral with the anchoring head 3 and defining at its upper end a valve seat 5, and a valve head 6 normally seated against the valve seat 5 and mounted fast on the valve plunger 7 that projects through and beyond the lower discharge end of the valve body and conduit section 1. The valve head is yieldingly urged toward closed position by a coil spring 8 and is opened by forced inward movements of the plunger 7. The upper or receiving end of the supply tube conduit 1 is adapted to be connected to a suitable source of water under pressure by a suitable coupling 9 and pipe 10. The receptacle, which is preferably and as shown in the form of an open-topped bowl 11 of generally circular outline is suspended from and pivoted with respect to the rigid conduit section 1 by means of a pivot pin 12 and other elements subsequently described, but shown best in Fig. 3. By reference to the drawings, it will be seen that in the preferred arrangement illustrated, the bowl 11 is formed at one side with a laterally or generally radially outwardly extended portion 13 providing a receiving chamber 14 that is open at its top and opens inwardly into the interior of the bowl. By further reference to the drawings, it will be seen that in this preferred arrangement, the rigid supply conduit section or tube 1 extends downwardly into the receiving chamber 14 and has its discharge end disposed in closely spaced relation to the bottom portion 15 of said receiving chamber. Hence, with the arrangement illustrated, the tubular supply conduit section 1 is located adjacent the periphery or marginal rim of the bowl-like receptacle 11 and is so widely spaced from the axis or center of the receptacle as to leave the bowl free of obstruction, so that relatively large animals, such as dogs, may drink freely from a relatively small bowl.

The side walls of the receiving chamber 14 of the bowl 11 are extended upwardly to provide a pair of laterally spaced anchoring flanges 16 and the pivot pin 12, which may be a conventional cotter pin, is passed through and anchored in aligned apertures in said flanges 16. Quickly detachable pivotal connection between the supply tube 1 and the pin 12 is made by means of a conduit mounted flange 17, an apertured arm or lever 18, loosely mounted on an upstanding annular collar 19 of the flange 17, and a coil compression spring 20 working over the supply tube 1 and compressed between the arm or lever 18 and an abutment shoulder 21 of an adjustable abutment nut 22. Nut 22 is, of course, screw threaded on the tube 1 and is adjustable thereto to vary the yielding pressure exerted by the spring 20 on the lever arm 18. The apertured flange 17 is internally threaded to receive the external threads of the supply tube 1 in the manner of a nut, so that it may be adjusted to a suitable position on the tube 1 by rotation about the axis of the tube. However, to retain the desired adjustment and prevent rotation of the flange 17 and associated elements on the tube 1, there is provided a suitable lock nut 23.

By reference to the drawings, it will be seen that the apertured lever arm 18 extends over and bears upon the upper edge or rim 24 of that portion of the bowl defining the radially outer wall of the bowl extension 13. By full lines in the drawings, this bowl or receptacle 11 is shown as swung to its extreme position in a counterclockwise direction, which may be also considered as the extreme upper position of the bowl; this being also the position assumed by the bowl or receptacle 11 when the volume of water therein has been reduced to a perdetermined minimum.

By still further reference to the drawings, and particularly to Fig. 3, it will be seen that when the receptacle or bowl 11 is in its upper full-line position, the lever arm 18 is seated on the pivot pin 12 at its intermediate portion, is seated on the inner upper edge 25 at its inner end portion, and has its outer end portion seated upon the marginal rim 24. It will also be seen that the yielding force exerted by the spring 20 on the lever arm 18 tends to yieldingly retain this relationship of elements above described and shown by full lines in Fig. 3. In practice, the yielding pressure exerted by the spring 20 on lever 18 will be adjusted by means of nut 22 so that it will be just sufficient to maintain the drinking bowl receptacle 11 in its upper full-line position of Fig. 3 under the combined weight of the bowl and a minimum volume of water X represented for example in Fig. 3. However, when the volume of water in the receptacle is increased to a level beyond that indicated, the increased weight will move the receptacle downwardly or counterclockwise on the pivot pin 12 and to the position shown by dotted lines in Fig. 3, where it is positively stopped by engagement of an upstanding stop flange 26 of the bowl 11 with the lower end of the supply tube 1. By reference to Fig. 3, it will be seen that as the bowl or receptacle 11 moves pivotally in a counterclockwise direction from its full-line position of said figure to its dotted line position thereof, the outer end of lever 18 is rocked upwardly about a fulcrum point or line defined by the inner edge 25 of flange 18 against the yielding pressure of spring 20. During this downward or clockwise pivotal movement of the bowl 11, and while the bowl 11 is in its downward position, the lever 18 is raised above and free of the pivot pin 12, but this is not objectionable for the reason that the combined weight of the bowl and fluid therein tends to maintain the pivot pin 12 firmly seated in the cooperating channel of flange 17, under these conditions. In Fig. 3, the maximum water level in the bowl is approximately indicated by dotted line X'.

That portion of the bowl or receptacle structure defining the bottom 15 of the receiving chamber 14 or a part thereof underlying the discharge end of supply tube 1 provides a valve plunger engaging and actuating surface portion or abutment. When the bowl is in its downward high water volume position, shown by dotted lines in Fig. 3, this bottom portion 15 has been moved free of and in spaced relation to the lower end of the valve plunger 7, so that the valve head 6 is closed against its cooperating valve seat 5 under the action of the valve spring 8, so as to completely cut off the supply of water. However, as the supply of water in the bowl 11 is progressively reduced below its upper level indicated by dotted line X', resultant upward or counterclockwise swinging movements of the bowl will bring the bottom surface 15 into engagement with the valve plunger 7 and cause the same and the valve head 15 to move upwardly therewith to open the valve to replenish the supply of fluid.

While the valve plunger-engaging portion 15 of the bowl moves generally upwardly and downwardly with respect to the valve plunger 17, it does, of course, also partake of arcuate movement with respect thereto, which will produce a sliding or cam-like action between the surface 15 and the valve 17. Hence, the surface 15 should be of material which will not unduly wear or scuff under this relative sliding movement. In some cases, it may be desirable to set in a metal wear plate in the body of a plastic bowl, but if the bowl is made of a hard plastic, such will not usually be necessary.

Preferably and as illustrated herein, the valve stem engaging the bottom portion 15 of the bowl is inclined in an outward direction to increase the relative valve-opening movement imparted to the valve plunger 7 as a result of a given pivotal movement of the bowl. It will be obvious, by reference to Fig. 3, that the relationship of the free end of the valve plunger 7 to the valve stem engaging portion or surface 15 of the cup or receptacle can be adjustably varied at will by screwing the tube 1 upwardly and downwardly in the internally threaded plunger 17, which, of course, will also call for readjustment of the spring pressure adjusting nut 22. A suitable splash baffle 27 is shown as adhesively secured to the outer wall 13 of the bowl receiving chamber 14.

Preferably and as illustrated, the outer end of the lever arm 18 is extended beyond the associated rim of the bowl to facilitate removal and application of the bowl and its pivot pin 12 from the mounting flange 17. The preferred procedure for removing the bowl is for the operator to engage the extended free end of the lever 18 with the thumb of one hand, and the nut 22 or that portion of tube 1 immediately thereabove, with a finger of the same hand and exert a squeezing pressure sufficiently to tip the lever 18 upwardly about the fulcrum point 25 against the action of spring 20 and well above the top of the pin 12. This leaves the pin 12 free for displacement from the associated channel in flange 17 and permits easy displacement of the bowl without removal of the pivot pin 12 from the bowl flanges 16, which latter incidentally act as guides to prevent rotation of the lever arm 18 when in operative position. The above-described procedure, of course, is reversed to reassemble the parts. Hence, it will be seen that the bowl is attached and detached respectively by what may be termed as a snap-on and snap-off operation, respectively. Furthermore, these snap-on and snap-off operations which are necessary for the purpose of bowl cleaning and valve replacement can be accomplished very quickly and with a minimum of effort without in any way disturbing the adjustments of the elements, as previously described.

My invention has been thoroughly tested and found to be completely satisfactory for the accomplishment of the objectives set forth; and while I have shown a certain preferred design, it will be understood that the same is capable of modification without departure from the scope and spirit of the invention as defined in the claims.

What I claim is:

1. In an animal drinking fountain, a rigid generally vertical water supply tube adapted for fixed mounting and for connection of its upper end portion to a source of water under pressure, a water receptacle pivotally mounted on said supply tube for swinging movements on a generally horizontal axis above the lower end portion of said tube and having its interior in receiving communication with the lower end portion of said rigid supply tube, the said axis of said swinging movements being laterally offset from the vertical axis of the receptacle so that the weight of fluid in the receptacle will tend to swing the receptacle downwardly about said pivot axis, yielding means urging the receptacle in an upward direction, a self-closing valve within and controlling flow through said tube, said valve comprising a yieldingly outwardly biased valve plunger projecting outwardly from the lower end portion of the conduit section and responsive to inward movements of which the valve is opened, the receptacle having a valve plunger engaging portion movable therewith and oriented to move in the direction of the valve plunger and move the latter inwardly to valve opened position responsive to upward swinging movements of the receptacle from said predetermined position and to move in a direction away from and allow outward movement of the valve plunger to valve closed position responsive to downward swinging movements of the receptacle toward said predetermined position, the value of the yielding force exerted by said yielding means on the receptacle being such that said yielding means will swing the receptacle and a predetermined minimum volume of water upwardly to valve opened position but will yield and allow downward swinging movements of the receptacle to valve closed position under the weight of the receptacle and a predetermined greater volume of water.

2. The structure defined in claim 1 in which the generally horizontal axis of swinging movements of the bowl is radially offset from the generally vertical axis of the supply tube.

3. The structure defined in claim 1 wherein the receptacle is an open topped bowl, and wherein the supply tube is disposed and pivoted adjacent the rim of the bowl.

4. In an animal drinking fountain, a rigid generally vertical water supply tube adapted for fixed mounting and for connection to a source of water under pressure, said tube having a discharge passage in its lower end portion, a water receptacle, a generally horizontal pivot pin mounted on the receptacle and being located in laterally offset relation to the vertical axis of the receptacle, a generally vertical rigid water supply tube having an open lower discharge end disposed within the receptacle, a flange carried by the water supply tube and having its upper surface disposed above the lower discharge portion of the tube, said flange having a transverse channel in which said pivot pin is seated for pivotal rocking movements of the receptacle with respect to the supply tube, a recessed lever embracing said tube and disposed over said flange, said receptacle defining a relatively fixed abutment laterally outwardly of said tube and pivot pin in a direction generally normal to the axis of said pivot, and said lever extending over and normally resting on the said abutment of the receptacle, a shoulder on the tube in upwardly spaced relation to the lever, a coil compression spring compressed between the lever and the said shoulder, a valve controlling flow through the supply tube and comprising a valve plunger extending generally axially from the lower delivery end of said tube, said valve being of the self-closing type and opening responsive to inward movements of the plunger, the receptacle defining a valve plunger engaging surface underlying the valve plunger which will move toward and from the valve plunger responsive to pivotal movements of the receptacle, said spring acting through said lever yieldingly urging the receptacle toward a predetermined upper position, and stop means limiting downward pivotal movements of the receptacle from said last position to a definite stop position.

5. The structure defined in claim 4 in which the said channel of said flange opens upwardly therethrough and in which the spring pressed lever is disposed immediately over said channel and pin.

References Cited in the file of this patent

UNITED STATES PATENTS

| | | |
|---|---|---|
| 651,877 | McCarthy | June 19, 1900 |